United States Patent Office 3,585,722
Patented June 22, 1971

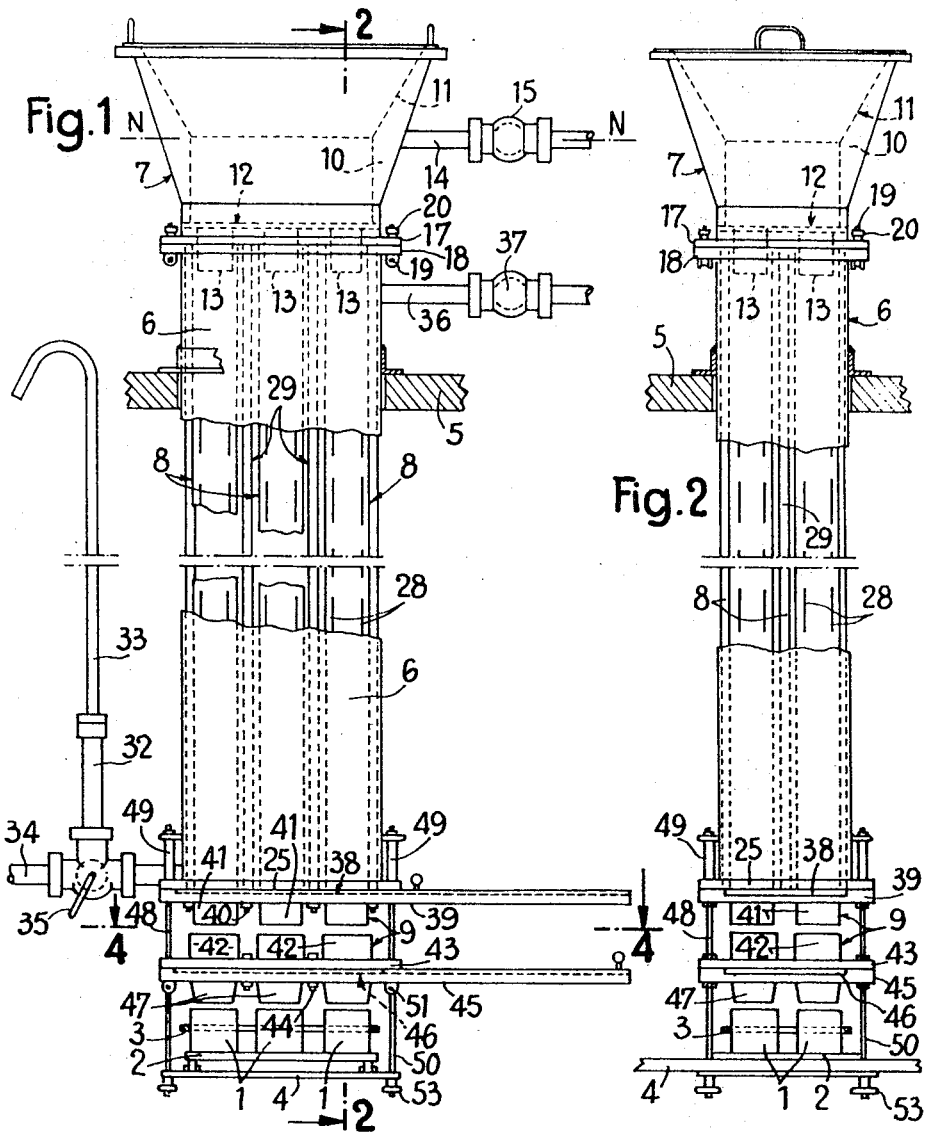
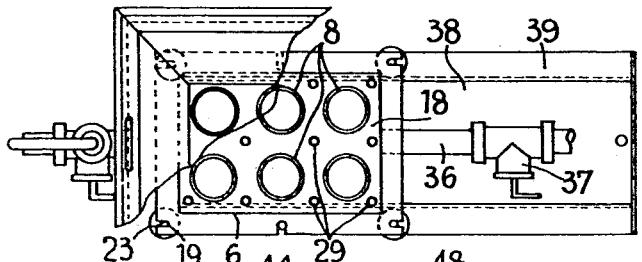
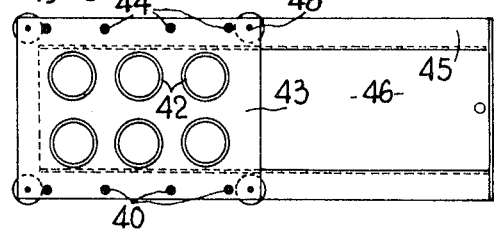

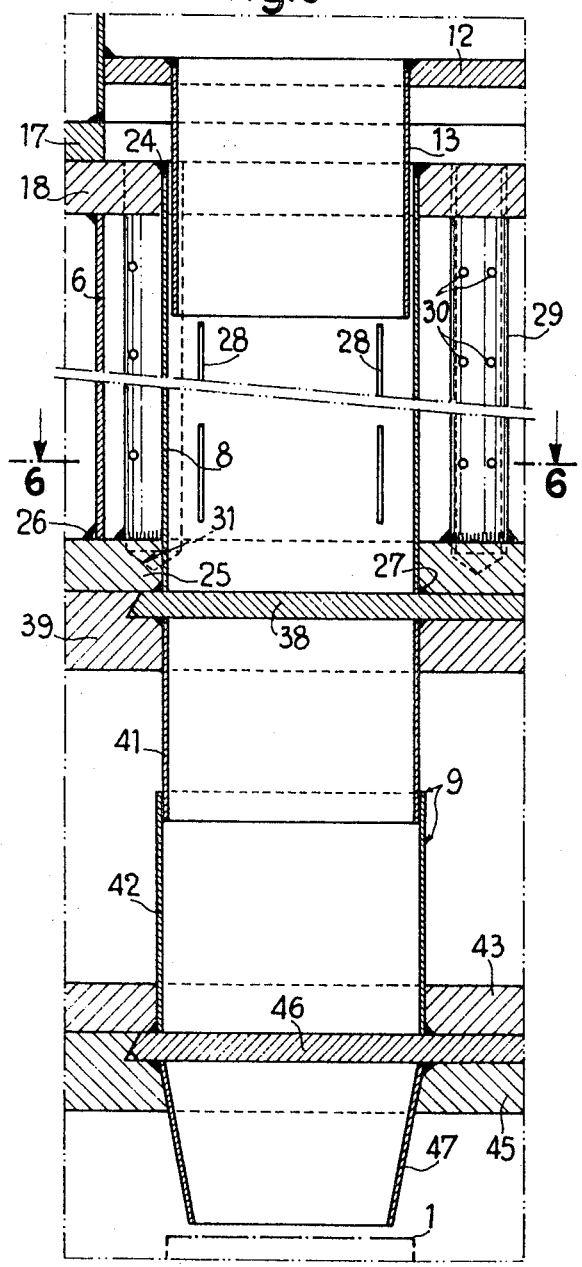
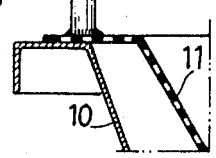
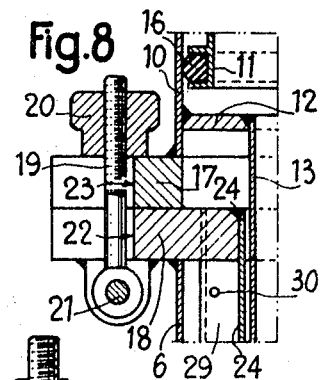
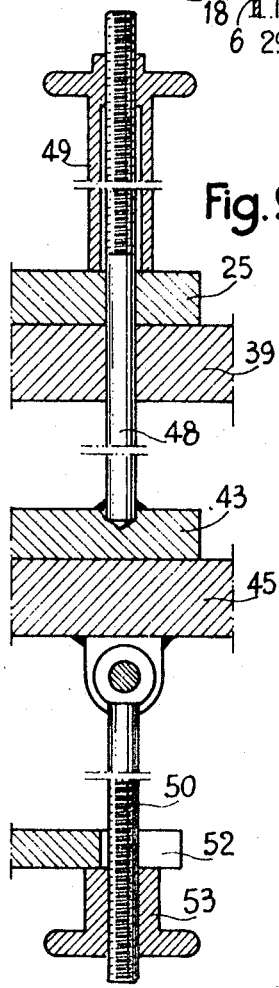
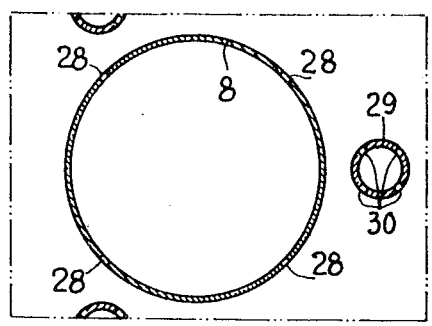

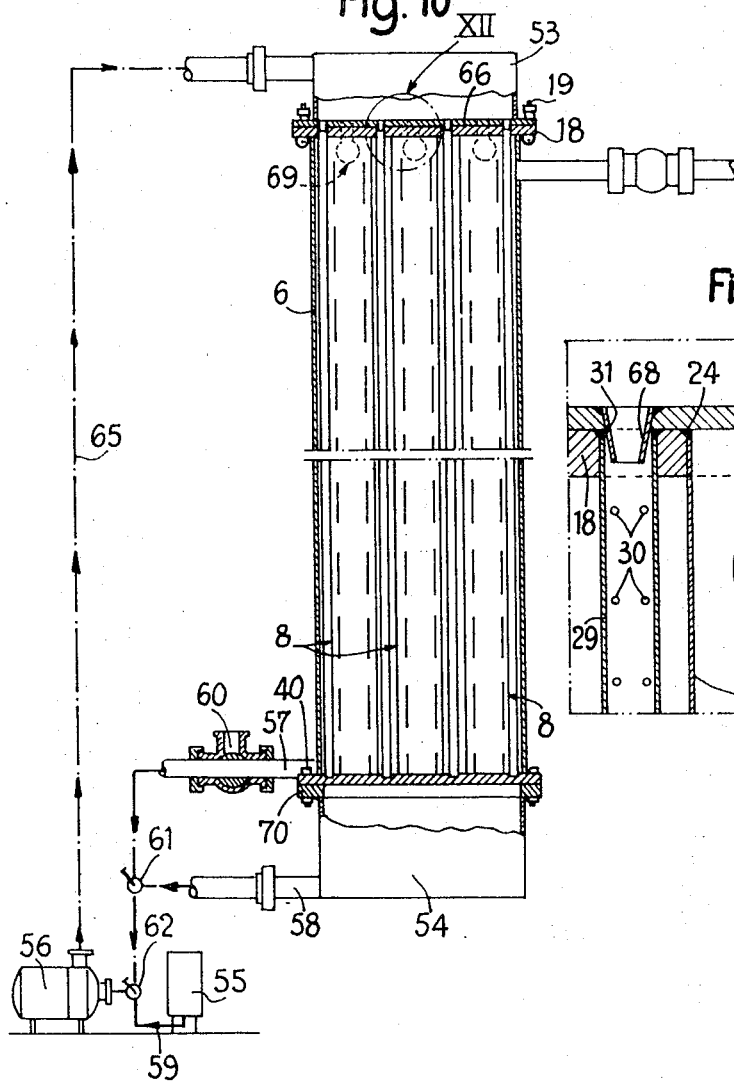

3,585,722
PROCESS AND MACHINE FOR CONTINUOUSLY MOULDING CHEESE OF THE SOFT PASTE TYPE
André Legueux, Bourmont, France, assignor to
J. Bongrain et Cie, Illoud, France
Filed Feb. 7, 1969, Ser. No. 797,534
Claims priority, application France, Feb. 13, 1968,
139,609
Int. Cl. A01j 25/13
U.S. Cl. 31—89
7 Claims

ABSTRACT OF THE DISCLOSURE

Process and machine for continuously moulding soft cheeses. The process comprises forming and then maintaining in at least one perforated drainage tube a vertical column of soft paste by feeding it continuously at its upper end by means of a hopper. This paste is concentrated by a filtering of a part of the serum and a predetermined height of the concentrated curd and remaining serum is taken off from the base of the column while maintaining the taken off height under the static pressure of the rest of the column. The taken off paste is transferred to a mould having the volume of said taken off part.

---

Figure 13:
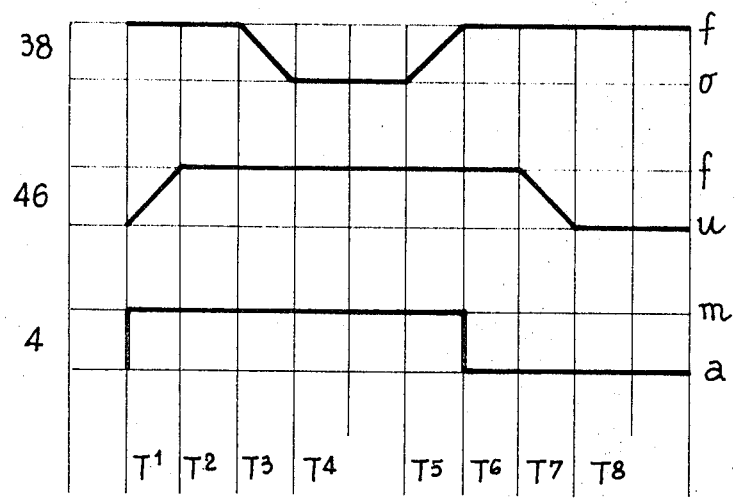

The present invention relates to the continuous moulding of cheese of the soft paste type whatever the materials employed on the input side of the machine for obtaining the curd discontinuously (employing basins, trays, vats for example) or continuously in conforming to the technology pertaining to each dairy product so as to avoid modifying its qualitative characteristics, the moulding being of the well-known type comprising forming and maintaining a vertical column of curd by a continuous supply to the upper end thereof.

The object of the invention is to provide an improved process for continuously moulding soft paste cheese of the aforementioned type from a mixture of curd and free serum, said process comprising extracting the free serum above and in the vertical column so as to obtain in the lower part of said column a curd of homogeneous moisture content, isolating, at the base of the column, a variable and predetermined height of said curd having a homogeneous moisture content, transferring said height of curd to a mould and allowing it to drain in accordance with the conventional process.

By this process it is possible to work on curd irrespective of its moisture content and constantly adapt the amount taken to the desired weight of the cheese, bearing in mind the degree of moisture of the curd taken.

Further, this process results in:

increased yield by elimination of any loss of raw material during the taking and moulding of the curd;
substantial decrease in the variation in the weight of cheeses of the same type, the soft pastes usually being sold by the unit;
a substantial saving in labour.

Preferably a number of columns are formed in parallel and the same number of curd takings are effected simultaneously.

Another object of the invention is to provide a machine for carrying out the aforementioned process. This machine comprises in combination with at least one vertical perforated drainage tube: a case for containing said tube, an upper hopper for distributing the mixture of curd and free serum in said tube; a set of two telescopic curd taking tubes having a relative position which is adjustable during the continuous operation and located under the lower end of the tube for receiving in the cavity they define a given amount of partly drained and homogeneous curd, and two movable registers located above and below said set of tubes so as to permit the filling of said cavity and then the separation thereof from the subjacent part of the column contained in said drainage tube and then the discharge of the amount of curd taken off into a mould.

In the case of a production employing a number of columns in parallel, there is provided a group of as many tubes as there are columns and, under each tube, a set of telescopic tubes, the supports and registers being common to all of the tubes.

Further features and advantages of the invention will be apparent from the ensuing description with reference to the accompanying drawing.

In the drawing:

FIG. 1 is a small scale front elevational view, with parts cut away, of a machine according to the invention;
FIG. 2 is a corresponding side elevational view, with a part in section along line 2—2 of FIG. 1;
FIG. 3 is a plan view of the machine, with parts cut away;
FIG. 4 is a horizontal sectional view taken along line 4—4 of FIG. 1;
FIG. 5 is a partial sectional view, on a scale larger than that of FIGS. 1–4, of one of the drainage tubes, in which is formed the column of soft paste, the set of subjacent telescopic tubes and two registers;
FIG. 6 is a sectional view taken along line 6—6 of FIG. 5;
FIGS. 7, 8 and 9 are partial vertical sectional views on an enlarged scale;
FIG. 10 shows the arrangement of the group of drainage tubes and the auxiliary device for cleaning the latter;
FIG. 11 is a front elevational view of the lower part of the upper box;
FIG. 12 is a partial sectional view, on an enlarged scale, of the portion enclosed by the circle XII in FIG. 10, and
FIG. 13 shows the time chart of one operational cycle of the machine.

(I) DESCRIPTION OF THE MACHINE

In the illustrated embodiment, the invention will be described as applied to the simultaneous filling of $n$ moulds 1, namely six moulds, bearing on a drainage plate 2.

The work unit is this drainage plate whose dimensions are identical to those of the pickling and maturing riddles the number $n$ of drainage moulds per plate being equal to the cheese capacity of the riddles. The drainage moulds 1 are assembled by a frame 3 so as to constitute a handling element each mould of which always occupies the same position on the drainage plate, which position corresponds to the position of the cheeses on refining riddles.

The successive plates 2 pass under the machine and are carried by the upper reach 4 of an endless chain or other handling conveyor which feeds the plates one by one under the machine proper.

This machine is suspended from a floor-support 5 through a casing 6.

This machine comprises from top to bottom:

an upper distributing hopper 7 fixed to the top of the casing;
a battery or group of drainage tubes 8 disposed in the casing 6 and affecting a moulding operation under the static pressure of a column of curd;
and a battery or group of tube sets or telescopic gauges 9 which are adjustable in a continuous manner at the base of the group of drainage tubes above the conveyor which presents thereunder, one by one, the plates 2 carrying the moulds 1.

Each of these parts will now be described in detail.

Upper hopper 7 (FIGS. 1, 2, 5 and 7).—This hopper is adapted to receive the mixture of curd and free serum to be moulded and distribute it in the group of drainage tubes after partial extraction of the free serum. It comprises two parts on the principle of a vat having a double wall 10, 11.

The outer wall 10 constitutes a case of solid sheet metal and is provided with a solid bottom wall 12 equipped with $n$ tubular nozzles 13, that is, in a number equal to the number of moulds 1 and arranged as the latter. Fixed to this outer case 10 midway of the height is a serum discharge tube 14 with a valve 15.

The inner wall 11 is of perforated sheet metal which is adapted at the base to the outer case by a socket having a sealing element 16 (FIG. 8). This perforated wall performs the function of a filter. During the moulding it retains the curd and guides it towards the subjacent group of drainage tubes 8, while the filtered serum passes into the double wall 10, 11 and is discharged by way of the tube 14.

The hopper is attached by means of a lower flange 17 to the projecting periphery of an upper plate 18 welded to the case 6. The flange 17 is secured to the plate 18 by bolts 19 and nuts 20 which can be rapidly moved away by tilting about a pivot pin 21 (FIG. 8), the bolt passing into notches 22 and 23 in the plate 18 and in the flange 17 for fixing.

Group of drainage tubes 8.—This group or battery comprises as many vertical tubes 8 as there are moulds 1 per plate 2. Corresponding to each mould is a tube whose horizontal section of course corresponds to that of the moulds and consequently that of the cheeses to be produced, the outer section of the tubes being at least roughly equal to the inner section of the moulds.

The tubes extend through the upper plate 18, onto which they are for example riveted or formed over at 224 (FIGS. 5 and 8), and a lower plate 25 which is welded at 26 under the casing 6 and to which the tubes are themselves welded at 27.

Throughout their height, the tubes 8 are perforated on six or eight generatrices, according to the shape of the cheeses, either with apertures or vertical slots 28 (FIGS. 1, 2, 5 and 6) so as to permit an additional discharge of free serum.

The arrangement of the tubes is governed by the arrangement of the moulds, since the axis of each of the tubes at the moment of moulding must be in the extension of the axis of the mould of the same position.

The height of the tubes can vary from 3 to 6 metres, depending on the desired production rate and on the specific characteristics of each considered product.

It is important that the degree of drainage in the tubes be limited to the extraction of the free serum so as to guarantee at the base of the tubes a curd which is homogeneous as concerns moisture content, without this drainage being excessive, otherwise the physicochemical and bacteriological characteristics of the traditional drainage might be modified.

It will be observed that provided in the casing 6 in addition to the drainage tubes 8 are cleaning tubes 29 located outside the tubes 8 and parallel to the latter. The tubes 29 are provided with apertures 30 (FIGS. 5, 6, 7 and 12) for the outlet of cleaning jets. They are fixed at their base in blind apertures 31 (FIG. 5) in the plate 25 while their upper ends are open and extend through the upper plate 18 onto which they are riveted or formed over at 31 (FIG. 12).

As all the tubes 8 are placed inside the fluidtight casing (6, 18, 25), the latter preserves the serum issuing from these tubes. This serum can be discharged by three means namely:

A siphon consisting of a telescopic tube 32, 33 (FIG. 1) which is adjustable in height and permits adjusting the level of the serum in the case to the desired height.

A drainage pipe 34 branching off the siphon at the base of the casing through a three-way cock 35. When put in communication with the casing, this pipe enables the whole of the serum contained therein to be extracted.

An overflow pipe 36 provided at the top of the casing at a level substantially ensuring that the drainage tubes 8 are roughly entirely immersed in the serum. A valve 37 is provided on this pipe.

A knife register or plate 38 is placed at the base of the drainage tubes 8 and has an alternating motion which ensures the simultaneous opening or closure of all the tubes at their lower ends.

This register is slidably mounted between the tube-carrying plate 25, and a removable plate 39 attached under the plate 25 by bolts 40 and nuts.

Group of telescopic gauges 9.—Its purpose is to ensure regularity in the weight of the cheeses as a function of the degree of moisture of the homogeneous curd at the base of the drainage tubes 8. These gauges or closed chambers are in a number equal to that of the tube 8 and moulds 1. Each one thereof is on the axis of a tube and corresponding mould.

Each gauge comprises a set of telescopic tubes. It comprises a fixed upper tubular portion 41 (FIGS. 1, 2 and 5) fixed to the plate or wall 39 so that it extends the drainage tube of which it has the same section; and a lower movable tubular portion 42 which is adapted to slide on the portion 41 (FIG. 5) and whose inner cross-section is equal to the outer cross-section of the portion 41 and that of the drainage tubes 8.

The height of each of the portions 41 and 42 is preferably about ⅔ of the height of the moulds 1.

The lower portions 42 of the gauges 9 are carried by a support plate 43 to the underside of which bolts 44 (FIGS. 1 and 4) secure another plate 45. Slidable between the two plates is a second register or sliding plate 46 (FIGS. 1, 2, 4 and 5).

In alignment with each tube 42 immediately below the register or wall 46 the plate 45 carries a frustoconical nozzle 47 (FIGS. 1, 2 and 5) for guiding the paste towards the subjacent mould 1.

The group 9 of gauges with the nozzles 47 is adjustable in height relative to the group of tubes 8 by means of a mechanism which vertically displaces the plates 43, 45 and everything carried thereby relative to the plates 25 and 39. This mechanism comprises four screwthreaded rods 48 welded to the plate 43 and freely extending through the plates 25 and 39 so as to receive in their upper screwthreaded portion a nut having a skirt 49 which bears on the upper plates of the tube-carrying plate 25 so that by simultaneous screwing or unscrewing of the four nuts the whole movable equipment 43–47 can be vertically adjusted relative to the plates 25 and 39. Consequently, it is possible to slide the lower portions 42 of the gauges on the fixed upper portions 41 as a function of the volume of the mould and cheeses to be obtained. In FIGS. 1 and 2 the machine is at rest and the tubes 42 are disengaged from below the tubes 41. On the other hand, FIG. 5 shows a position of adjustment.

A device, for example having bolts 50 (FIGS. 1, 2 and 9) which are pivoted at 51 to the plate 45, engage in notches 52 in the upper reach 4 of the moulding chain or conveyor and are combined with nuts 53, connects this upper reach 4 to the plates 43 and 45 so that this reach can be raised therewith and the small space between the nozzles 47 and the moulds 1 remains constant.

Auxiliary cleaning device for the group of drainage tubes 8 (FIGS. 10–12).—It comprises in combination: an upper box 53 for distributing the washing solution, a lower box 54 for collecting this solution, a tank 55 for preparing this solution and a motor-pump unit 56 which draws in liquid through the conduits 57, 58 and 59 from the base of the casing 6, the box 54 and the tank 59 respectively under the control of valves 60, 61 and 62. This unit 56 discharges by way of a conduit 65 into the upper box 53.

This box 53 is so arranged that its bottom wall 66 is adapted on the upper plate 18 to which it can be rapidly fixed in lieu of the hopper 7 by means of pivoting bolts 19 which are engaged in notches 67 in this bottom wall (FIG. 11). This bottom wall comprises, extending therebelow but communicating with the interior of the box, on one hand, frustoconical nozzles 68 each of which is adapted to be engaged in one of the perforated cleaning tubes 29 provided in the casing 6 (see FIG. 12) and, on the other hand, spray heads 69 each of which is adapted to be engaged in one of the drainage tubes 8.

The lower collecting box 54 is open at its upper end where a flange 70 enables it to be fixed by bolts 40, in lieu of the plate 39 carrying the upper elements 41 of the telescopic gauges 9. The lower ends of the drainage tubes 8 therefore open into this box 54 when it is placed in position (FIG. 10).

(II) OPERATION

The process according to the invention is carried out in the following manner:

The coagulation of the milk and the curding before moulding are identical to the traditional process. The milk is renneted at the defined rate for the manufacturing shop, continuously or discontinuously if pans, tanks or vats are employed. In the latter case, upon moulding, the work resumes a continuous rhythm. If A is the number of renneted units per hour corresponding to the chosen rate, each unit will be continuously poured into the distributing hopper within 60/A minutes.

There will now be described in turn: the starting up of the machine, a complete moulding cycle, the adjustment of the weight of the cheeses and the cleaning of the machine.

Starting up of the machine

With the register 38 in the position for closing the drainage tubes 8 (FIG. 5), it is advisable to partly fill the moulder with the free serum of the first vats so that the curd does not fall to the bottom of the tubes 8.

The mixture of the curd and its free serum is then poured into the moulder at the chosen rate until it reaches the level N—N of the tube 14 discharging the serum from the distributing hopper 7. The moulding proper starts at this moment.

The telescopic siphon 32–33 for extracting the serum from the casing is set at the desired level.

Moulding cycle

The moulder comprises in fact three moving parts: the upper register 38 closing the drainage tubes 8, the lower register 46 closing the tubes 42 of the telescopic gauges, and the moulding conveyor 4.

Their movements are synchronized in accordance with the following table and the time chart shown in FIG. 13, where $f$ signifies "closed," $o$, "open," $m$, "moving" and $a$, "stopped."

| | Upper register 38 | Lower register 46 | Moulding conveyor 4 |
|---|---|---|---|
| Departure point of the cycle | Closed | Open | Stopped. |
| Time $T^1$ | do | Closing movement. | Operating. |
| Time $T^2$ | do | Closed | Discharge of plate moulded in preceding cycle. |
| Time $T^3$ | Opening | do | Do. |
| Time $T^4$ | Open | do | Do. |
| Time $T^5$ | Closing | do | Approach of the plate to be moulded. |
| Time $T^6$ | Closed | do | Stopped. |
| Time $T^7$ | do | Opening | Stationary. |
| Time $T^8$ | do | Open | Do. |

End of the cycle followed by the start of a new cycle.

At time $T^4$, the base of the column of homogeneous curd descend in the gauges 9 whose height has been adjusted for producing cheeses of a given weight. When the upper register 38 is closed, the column of homogeneous curd is severed at the desired height.

At time $T^8$, the opening of the lower register 46 allows the homogeneous curd contained in each of the gauge moulds 9 to fall into the corresponding drainage moulds in position under the nozzles 47. The traditional drainage is then carried out in these moulds.

All the cycle times are constant, except the time $T^6$ whose duration can be modified as desired.

The duration of this time $T^6$ is so calculated that the level of the curd in the distributing hopper 7 remains constant. The volume of curd moulded during one cycle exactly corresponds to the volume of curd poured into the hopper during one cycle.

This balance between the moulding rate and the curd pouring rate into the moulder ensures that the height of the curd remains constant, that is to say, that the pressure at the base of the columns of curd contained in the drainage tubes 8 remains constant. This constant pressure ensures a certain homogeneity in the moisture content of the curd during the production time.

Regulation of the weight of the cheeses

The soft pastes, sold by the unit, are characterized by a given weight of total dry extract for a cheese. When moulding, the height of the mould gauges 9 must be such that the volume of homogeneous and moist curd determined thereby contains this weight of total dry extract. For a given type of cheese, the height of the gauges 9 is therefore a function of the degree of moisture of the homogeneous curd at the base of the drainage tubes 8. Corresponding to each moisture content, is a height of the gauges 9 which is set by vertically shifting the whole of the lower movable assembly (1–4, 42–47).

According to the cheese yield of the milk, it is possible to: (a) Maintain constant the hourly output of moulded cheeses; for this, it is sufficient to adapt the volume of milk to be renneted to the output, the time $T^6$ of the cycle remaining constant. (b) Maintain constant the volume of milk treated per hour; in this case, the duration of the time $T^6$ of the cycle is adjusted so as to maintain the level of the curd in the distributing hopper constant.

Washing of the drainage tubes

At the end of the work, the moving parts are removed and washed by dipping, namely the distributing hopper, the group 9 of telescopic gauges with the plates therefor.

Only the group 8 of drainage tubes and the series of perforated tubes 29 forming the vertical washing jets remain in position in the casing 6.

The washing box or dome 53 is fixed on the casing, the nozzles 68 and the spray head 69 respectively engaging in the tubes 29 and in the tubes 8.

The washing solution collector box 53 is fixed at the base of the casing.

Then, the outlet pipe 58 of this box 54 and the drainage pipe at the base of the case 1 are fixed to the inlet of the pump 56 and a washing cycle is carried out by starting up this pump.

(III) MAIN ADVANTAGES OF THE PROCESS AND MACHINE ACCORDING TO THE INVENTION

Quality.—The invention is adaptable to all manufacturing processes whether they are discontinuous or continuous.

It wholly complies with the technology pertaining to each product.

There is no brutal mechanical action on the curd.

The free serum is discharged rapidly and in a natural manner, the internal serum being discharged as in traditional processes during the drainage in the moulds; in this way, moulding holes are avoided (serum pocket or air pocket).

The drainage is effected with excellent regularity, which produces high-quality products without modifying the organoleptic characteristics.

Yield.—This is improved by the avoidance of losses of raw materials during the moulding; high regulariity is achieved in the weight of the cheeses.

Productivity.—Owing to the fact that the tubes only serve to effect a drainage limited to the discharge of the free serum, a high production rate can be achieved (up to 360 drainage plates per hour.

The machine has a high flexibility of utilization.

High-capacity discontinuous renneting materials can be employed.

There is a great economy of labour, in particular owing to the closed-circuit washing of the drainage tubes.

Having now described my invention, what I claim as new and desire to secure by Leters Patent is:

1. A process of continuously moulding soft paste cheeses from a mixture of curd and free serum comprising supplying said mixture to a plurality of fixed laterally spaced vertical perforated tubes at a rate to maintain a column of said mixture in each tube at a constant level during moulding, collecting, under controlled conditions during moulding, the serum passing through said perforations in a case coextensive with and surrounding said tubes, taking off, at the base of the tubes, a predetermined height of curd in a closed chamber which is located under and connected to each of said tubes and comprises telescopic rigid lateral walls, a transversely slidable top wall and a transversely slidable bottom wall, said top wall and bottom wall being common to said chambers, said curd being taken off by sliding open said top wall to allow a bottom portion of the columns of curd to fill said chambers and thereafter sliding closed said top wall, and transferring said height of curd to an underlying mould by sliding open said bottom wall.

2. A process as claimed in claim 1, further comprising measuring, during moulding, the moisture content of the curd at the base of said tubes and regulating the length of said chambers by telescopically shifting said lateral walls thereof in accordance with said moisture content, whereby the curd taken off has, when dried, the required weight.

3. A machine for carrying out a process for continuously moulding soft paste cheeses from a mixture of curd and serum, said machine comprising in combination: a plurality of fixed laterally spaced vertical perforated drainage tubes for containing a column of said mixture; a casing coextensive with and containing said tubes for receiving serum which has passed through said orifices; means for maintaining the serum in said casing at a constant pressure during moulding; an upper hopper fixed relative to said tubes for distributing the mixture of curd and serum in said tubes; means for ascertaining the level of said mixture and said hopper; a closed chamber located under and connected to each tube for receiving a given amount of partly drained curd, each chamber comprising a set of two axially relatively adjustable telescopic tubes and two transversely sliadbale registers located at upper and lower ends of said set of tubes so as to permit the filling of said chamber with a predetermined amount of curd and then the separation thereof from the column contained in said drainage tube and then the discharge of said amount of curd taken off into a mould, said register being common to all of said chambers.

4. A machine as claimed in claim 3, wherein said hopper is arranged to permit a continuous extraction of free serum at a given fixed level.

5. A machine as claimed in claim 3, wherein an upper tube of each set of telescopic tubes for taking off the curd is fixed under a support for the drainage tubes, a lower tube of said set being carried by a movable support adjustable in height.

6. A machine for carrying out a process for continuously moulding soft paste cheeses from a mixture of curd and free serum, said machine comprising in combination a plurality of vertical perforated drainage tubes for containing columns of said mixture: a casing for containing said tubes; an upper hopper for distributing the mixture of curd and free serum to said tubes; a set of two telescopic curd taking tubes having a relative position which is adjustable during the continuous operation and located under a lower end of each drainage tube for receiving in a cavity they define a given amount of partly drained and homogeneous curd, and two movable registers located above and below said sets of telescopic tubes so as to permit the filling of said cavities and then the separation of the received curd from the part of the column contained in said drainage tubes and then the discharge of the amount of curd taken off into moulds, the machine further comprising, located in said casing and between the perforated drainage tubes, auxiliary parallel perforated cleaning tubes for cleaning said drainage tubes with jets of water issuing through the perforations in said auxiliary tubes.

7. A machine as claimed in claim 6, comprising for cleaning said drainage tubes by means of said auxiliary tubes a cleaning device employing washing water and comprising an upper box and a lower box adaptable to said casing at both ends of the drainage tubes after removal of said hopper and said sets of telescopic tubes, said upper box having a bottom wall from which depend nozzles adapted to penetrate said drainage tubes, said lower box being open at the top thereof for receiving the washing water which has flowed through said drainage tubes, and a pump sucking in washing water in parallel from the bottom of said casing and said lower box and delivering said water to the upper box.

References Cited

UNITED STATES PATENTS

| | | | |
|---|---|---|---|
| 2,868,651 | 1/1959 | Manwaring | 31—46X |
| 3,041,153 | 6/1962 | Elder et al. | 31—89 |
| 3,142,904 | 8/1964 | De Boer | 31—46X |
| 3,438,131 | 4/1969 | Ubbels et al. | 31—46 |
| 3,468,026 | 9/1969 | Robertson et al. | 31—46X |

HUGH R. CHAMBLEE, Primary Examiner

U.S. Cl. X.R.

31—46